United States Patent
Ozawa et al.

(10) Patent No.: US 6,508,506 B2
(45) Date of Patent: Jan. 21, 2003

(54) FRONT END STRUCTURE OF VEHICLE

(75) Inventors: Ikuo Ozawa, Toyoake (JP); Noriaki Maeda, Kariya (JP); Norihisa Sasano, Ama-gun (JP); Toshiki Sugiyama, Kariya (JP)

(73) Assignee: Denso Corporation, Kariya (JP)

( * ) Notice: Subject to any disclaimer, the term of this patent is extended or adjusted under 35 U.S.C. 154(b) by 8 days.

(21) Appl. No.: 09/822,613

(22) Filed: Mar. 30, 2001

(65) Prior Publication Data

US 2001/0026082 A1 Oct. 4, 2001

(30) Foreign Application Priority Data

Apr. 3, 2000 (JP) ........................................ 2000-105382

(51) Int. Cl.[7] .............................................. B62D 25/08
(52) U.S. Cl. .................. 296/194; 296/203.02; 293/113
(58) Field of Search ................................ 296/193, 194, 296/196, 197, 203.01, 203.02; 293/115, 113; 180/68.4, 68.6

(56) References Cited

U.S. PATENT DOCUMENTS

| | | | | |
|---|---|---|---|---|
| 4,597,603 A | * | 7/1986 | Trabert | 296/194 |
| 4,944,540 A | * | 7/1990 | Mansoor et al. | 293/115 |
| 5,123,695 A | * | 6/1992 | Kanemitsu et al. | 296/194 |
| 5,271,473 A | * | 12/1993 | Ikeda et al. | 296/194 |
| 5,358,304 A | * | 10/1994 | Kanemitsu et al. | 296/194 |
| 5,403,048 A | * | 4/1995 | Ekladyous et al. | 293/115 |
| 5,409,288 A | * | 4/1995 | Masuda | 296/194 |
| 5,533,780 A | * | 7/1996 | Larson et al. | 296/194 |
| 5,573,299 A | * | 11/1996 | Masuda | 296/194 |
| 6,027,150 A | * | 2/2000 | Flewitt et al. | 293/115 |
| 6,186,583 B1 | * | 2/2001 | Martin | 296/194 |
| 6,216,810 B1 | * | 4/2001 | Nakai et al. | 296/194 |
| 6,347,823 B1 | * | 2/2002 | Ozawa et al. | 296/194 |
| 6,364,403 B1 | * | 4/2002 | Ozawa et al. | 296/194 |

* cited by examiner

*Primary Examiner*—D. Glenn Dayoan
*Assistant Examiner*—Greg Blankenship
(74) *Attorney, Agent, or Firm*—Harness, Dickey & Pierce, PLC

(57) ABSTRACT

A front end structure of a vehicle for preventing heat from going around to before a heat exchanger (or vehicle) while reducing the damage of a shock which may be imparted on the front end portion of the vehicle is disclosed. Gaps are formed between a panel wall portion and a bumper cover, between the panel wall portion and a grille, between a bumper wall portion and the panel, and between a grille wall portion and the panel. At the same time, labyrinth structures are configured of the panel wall portion and the bumper wall portion on the one hand and the panel wall portion and the grille wall portion on the other hand. As a result, heat is prevented from going (flowing) around to before the heat exchanger (or vehicle) while at the same time reducing the damage under a shock which may be imparted on the front end portion of the vehicle.

6 Claims, 7 Drawing Sheets

FRONT END STRUCTURE OF VEHICLE

BACKGROUND OF THE INVENTION

1. Field of the Invention

The present invention relates to a front end structure of a vehicle comprising a front end panel arranged on the front end portion of the vehicle so that the front portion of the vehicle is compartmented into an engine compartment containing an internal combustion engine (engine) and a portion other than the engine compartment.

2. Description of the Related Art

The heat exchanger such as the radiator or the condenser is for cooling the fluid such as the cooling water or refrigerant by introducing air from the front end of the vehicle. In the case where the vehicle is stationary or running slowly, however, the heat generated by the engine in the engine compartment goes around to before the heat exchanger (or vehicle) through the gap between the front end panel and the vehicle body or along the ground surface, and therefore the cooling capacity of the heat exchanger is deteriorated.

The conventional system to cope with this problem, as shown in FIG. 6, comprises a duct 101 extended toward the vehicle front from a front end panel 100 for blocking the heat which otherwise might flow into a heat exchanger 200 while at the same time introducing the fresh air (air not containing heat) existing before the vehicle into the heat exchanger thereby to prevent the cooling capacity of the heat exchanger from being deteriorated.

With the solving means described above, however, a shock, if imparted to the front end portion of the vehicle, acts on the duct through a bumper reinforcement, a bumper cover 410, a design grille, etc., and therefore the duct and the front end panel having the duct are liable to be damaged.

This problem may be solved by means of forming in advance a gap corresponding to the shock-caused deformation of the bumper reinforcement, the bumper cover 410 and the design grille between the end portion of the duct in the vehicle front side and the bumper reinforcement, the bumper cover 410 or the design grille. With this means, however, the heat goes around to before the heat exchanger (or vehicle) through the gap formed between the end portion of the duct in the vehicle front side and the bumper reinforcement, the bumper cover 410 or the design grille, thereby adversely affecting the cooling capacity of the heat exchanger.

As shown in FIG. 7, another means, conceivable for solving this problem, is to attach the duct 101 as a separate part on the front end panel 100 by such fastening means as a clip Cp and to decrease the strength of the duct 101 as compared with the strength of the front end panel 100 so that the duct 101 constituting the separate part may be broken first under a shock which may be imparted. However, with this means, the production cost of the vehicle is increased undesirably since the number of parts of the vehicle front end portion and the number of assembly steps are increased.

SUMMARY OF THE INVENTION

In view of the problem points described above, the object of the present invention is to provide a front end structure of the vehicle in which heat is prevented from going around to before the heat exchanger (or vehicle) while reducing the damage under a shock which may be imparted on the front end portion of the vehicle.

In order to achieve the object described above, according to one aspect of the invention, there is provided a front end structure of a vehicle, comprising a front end panel (100) arranged on the front end portion of the vehicle for compartmenting the front portion of the vehicle into an engine compartment containing an internal combustion engine and a portion other than the engine compartment, the front end panel (100) including an air inlet (140) for introducing air from the front side of the vehicle into the engine compartment, a cooling heat exchanger (200) for cooling the fluid with the air passing through the air inlet (140), and a bumper cover (410) arranged forward of the front end panel (100) and covering a bumper reinforcement (400) for absorbing the shock acting on the front end portion of the vehicle, wherein the front end panel (100) includes a panel wall portion (141) protruded toward the vehicle front side from the outer edge portion of the air inlet (140) and having the forward end portion thereof spaced from the bumper cover (410) with a predetermined gap ($\delta 1$), wherein the bumper cover (410) includes a bumper wall portion (411) protruded toward the front end panel (100) and having the end portion thereof spaced from the front end panel (100) with a predetermined gap ($\delta 2$), and wherein the wall portions (141, 411) have surfaces (144, 412) facing in opposed relation to each other, respectively.

As a result, the draft resistance (pressure loss) on the opposed surfaces (144, 412) prevents the heat from going (flowing) around to before the heat exchanger (200). Thus, the deterioration of the cooling capacity of the cooling heat exchanger (200) is prevented while at the same time reducing the damage under a shock which may be imparted on the front end portion of the vehicle.

The opposed surfaces (144, 412) may be either in a spaced relation or in contact with each other.

According to another aspect of the invention, there is provided a front end structure of a vehicle, comprising a front end panel (100) arranged on the front end portion of the vehicle for compartmenting the front portion of the vehicle into an engine compartment containing an internal combustion engine and a portion other than the engine compartment, the front end panel (100) including an air inlet (140) for introducing air from the front side of the vehicle into the engine compartment, a cooling heat exchanger (200) for cooling the fluid with the air passing through the air inlet (140), and a design grille (300) arranged forward of the front end panel (100) for forming a design shape of the front end portion of the vehicle, wherein the front end panel (100) includes a panel wall portion (141) protruded toward the vehicle front side from the outer edge portion of the air inlet (140) and having the forward end portion thereof spaced from the design grille (300) with a predetermined gap ($\delta 4$), wherein the design grille (300) includes a grille wall portion (320) protruded toward the front end panel (100) and having the end portion thereof spaced from the front end panel (100) with a predetermined gap ($\delta 5$), and wherein the wall portions (141, 320) have surfaces (143, 321) facing in opposed relation to each other, respectively.

As a result, the draft resistance (pressure loss) on the opposed surfaces (143, 321) prevent the heat from going (flowing) around to before the heat exchanger (200). Thus, the deterioration of the cooling capacity of the cooling heat exchanger (200) is prevented while at the same time reducing the damage under a shock which may be imparted on the front end portion of the vehicle.

The opposed surfaces (143, 321) may be either in spaced relation or in contact with each other.

According to still another aspect of the invention, there is provided a front end structure of a vehicle, comprising a front end panel (100) arranged on the front end portion of the vehicle for compartmenting the front portion of the vehicle into an engine compartment containing an internal combustion engine and a portion other than the engine compartment, the front end panel (100) including an air inlet (140) for introducing air from the front side of the vehicle into the engine compartment, a cooling heat exchanger (200) for cooling the fluid with the air passing through the air inlet (140), a bumper cover (410) arranged forward of the front end panel (100) and covering the bumper reinforcement (400) for absorbing the shock which may act on the front end portion of the vehicle, and a design grille (300) arranged forward of the front end panel (100) for forming a design shape of the front end portion of the vehicle, wherein the front end panel (100) includes a panel wall portion (141) protruded toward the vehicle front side from the outer edge portion of the air inlet (140) and having the forward end portion thereof spaced from the bumper cover (410) and the design grille (300) with predetermined gaps ($\delta 1$, $\delta 4$), wherein the bumper cover (410) includes a bumper wall portion (411) protruded toward the front end panel (100) and having the end portion thereof spaced from the front end panel (100) with a predetermined gap ($\delta 2$), wherein the design grille (300) includes a grille wall portion (320) protruded toward the front end panel (100) and having the end portion thereof spaced from the front end panel (100) with a predetermined gap ($\delta 5$), and wherein the panel wall portion (141) faces to the bumper wall portion (411) and the grill wall portion (320) in opposed relation, respectively.

As a result, like the front end structures of the vehicle described above, heat is prevented from going (flowing) around to before the heat exchanger (200), while at the same time reducing the damage under a shock which may be imparted on the front end portion of the vehicle.

According to yet another aspect of the invention, there is provided a front end structure of a vehicle, wherein the panel wall portion (141) and the wall portion(s) (411 and/or 320) in opposed relation to the panel wall portion (141) are arranged substantially in parallel to the longitudinal direction of the vehicle.

As a result, when a shock directed from the front side to the rear side of the vehicle acts on the vehicle front end portion, the wall portion(s) (411 and/or 320) opposed to the panel wall portion (141) can be deformed (displaced) toward the front end panel (100) without interference between the panel wall portion (141) and the wall portion(s) (411 and/or 320) opposed to the panel wall portion (141), thereby making it possible to more surely reduce the damage from the shock which may be imparted on the front end portion of the vehicle.

Incidentally, the reference numerals in the parentheses attached to the respective means described above represent correspondence to the specific means included in the embodiments described later.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS (First Embodiment)

Figure 1:
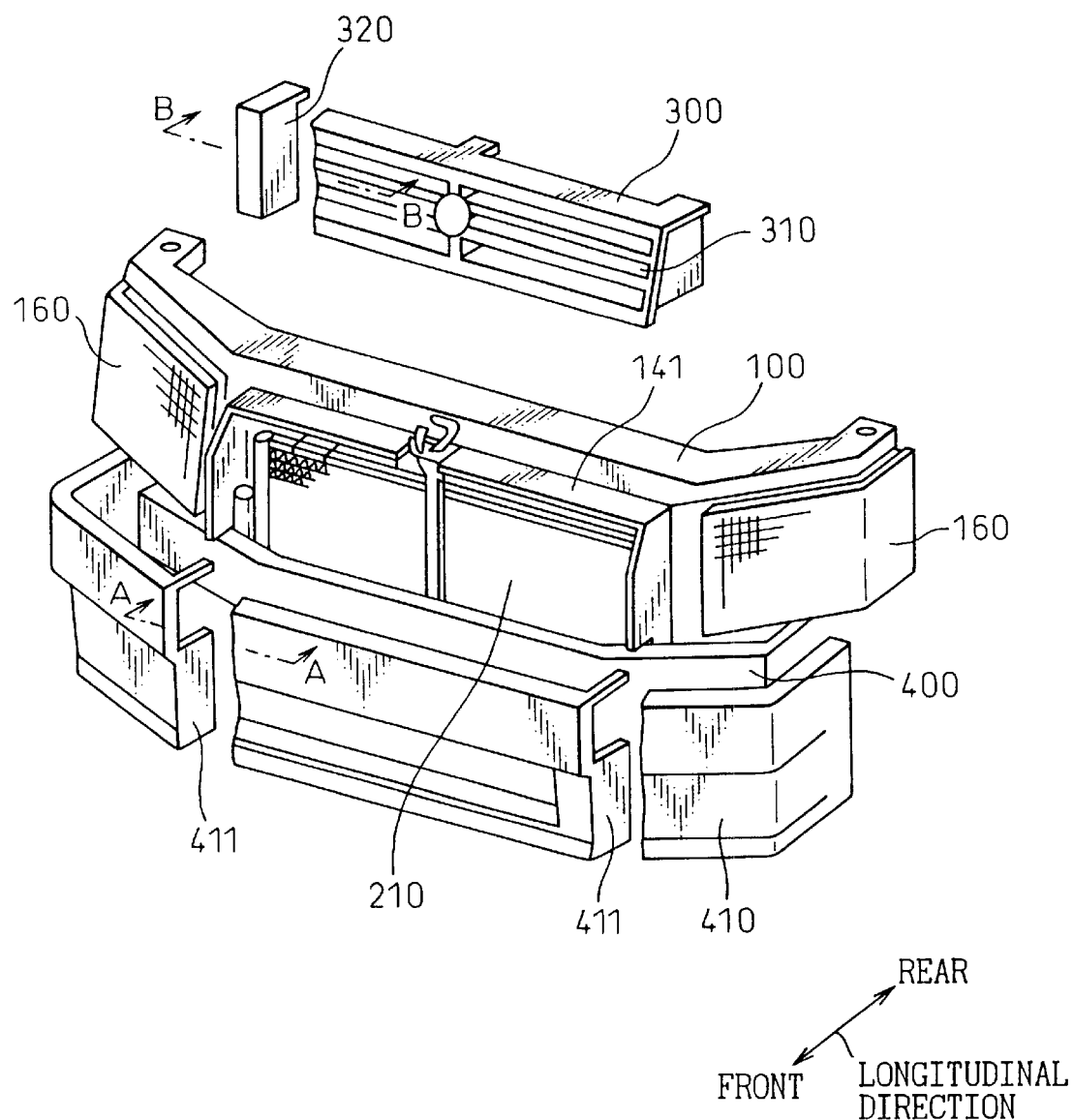
FIG. 1 is an exploded perspective view showing a front end structure of a vehicle according to a first embodiment of the invention.

FIG. 1 is an exploded perspective view showing a front end structure of a vehicle according to an embodiment of the invention. Reference numeral 100 designates a front end panel (carrier) of resin (glass reinforced polypropylene in this embodiment) arranged on the front end portion of the vehicle for compartmenting the front portion of the vehicle into an engine compartment containing an engine (not shown) and a portion other than the engine compartment. The front end panel 100 is secured to the side body (side member) of the vehicle through removable fastening means (not shown) such as bolts.

Figure 2:
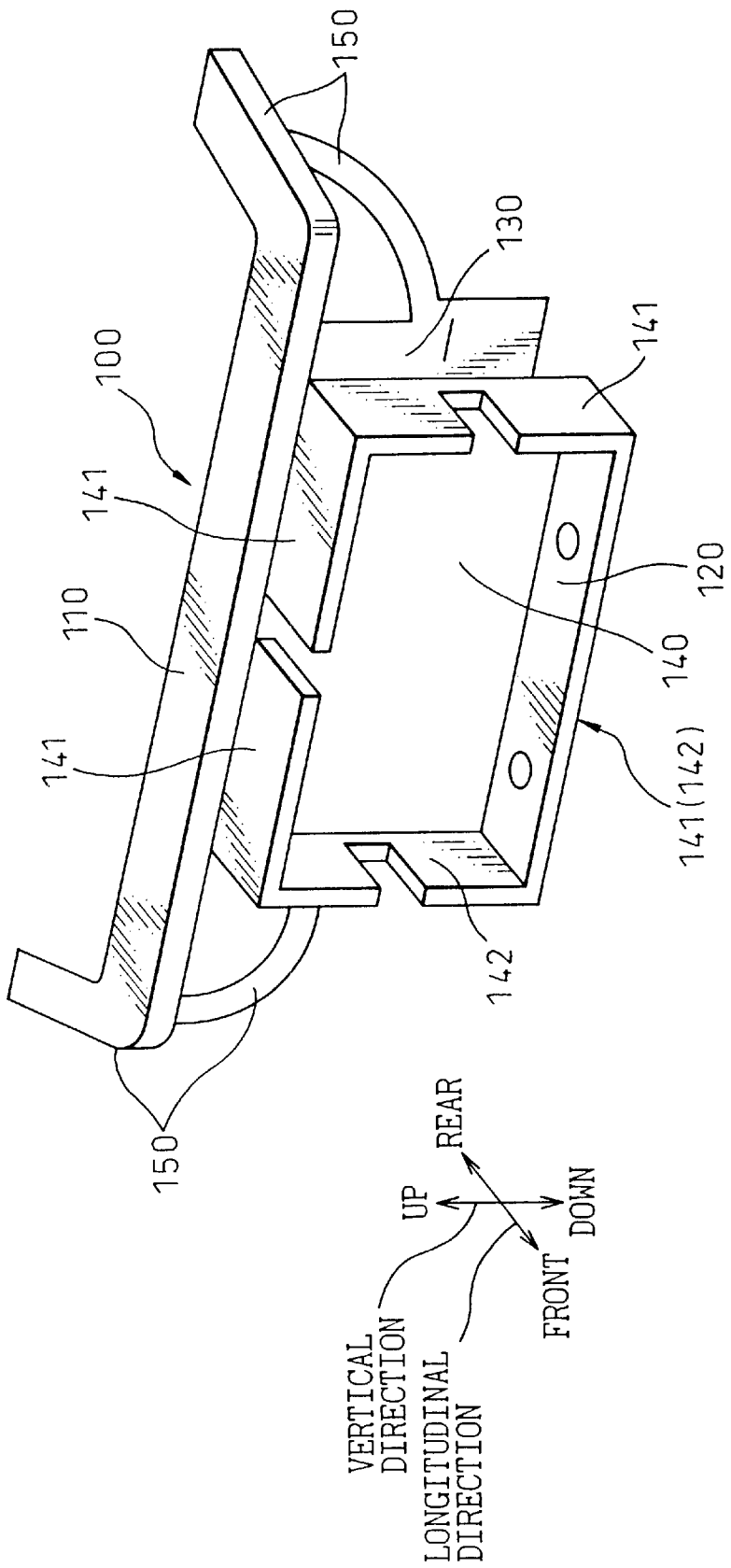
FIG. 2 is a perspective view of a panel used with the front end structure of the vehicle according to the first embodiment of the invention.

The front end panel (hereinafter referred to simply as "the panel") 100 includes, as shown in FIG. 2, an integrated resin structure of an upper beam member 110 a located on the upper side and extending transversely (horizontally) of the vehicle, a lower beam member 120 located at the lower side and extending transversely of the vehicle thereby to constitute a part of a guide duct portion (panel wall portion 141) described below, columnar support units 130 extending vertically on both lateral sides for coupling the beam members 110, 120 to each other, a cooling air inlet (air inlet) 140 in the form of a rectangular frame formed of the beam members 110, 120 and the columnar support units 130, and bracket units 150 extending downward from the upper end sides of the support units 130 to the vehicle lateral sides for securing the panel 100 to the vehicle body. As shown in FIG. 1, headlights 160 are assembled on the bracket units 150.

The cooling air inlet 140 is for introducing air (cooling air) into the engine compartment from the front side of the vehicle. As shown in FIG. 2, the panel wall portion 141 protruded from the panel 100 toward the vehicle front side is formed over the entire periphery of the outer edge portion of the cooling air inlet 140 of the panel 100, and the panel wall portion 141 constitutes a guide duct portion 142 for introducing fresh air existing before the vehicle to the cooling air inlet 140.

Figure 3:
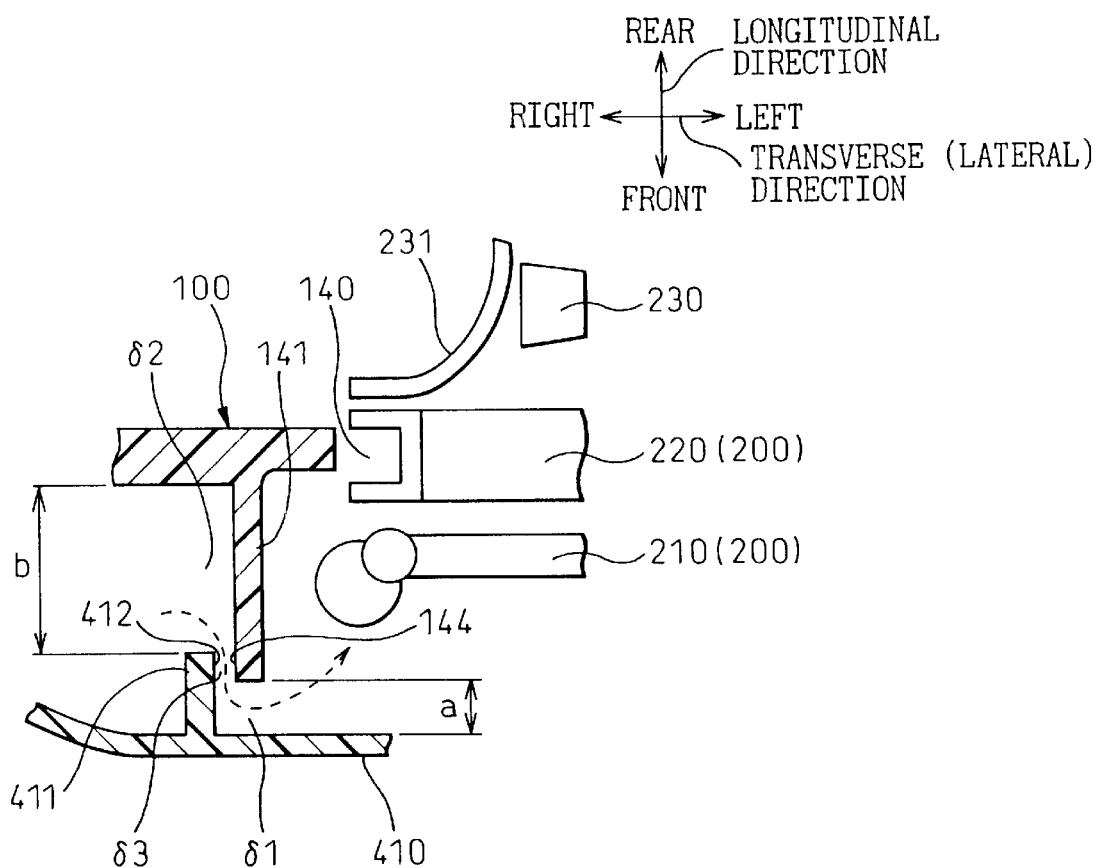
FIG. 3 is a sectional view taken in line A—A in FIG. 1.

In the cooling air inlet 140 (the guide duct portion 142), as shown in FIGS. 1 and 3, an external heat exchanger (condenser or radiator) 210 for cooling the refrigerant by exchanging heat between the refrigerant (fluid) of the vehicle air conditioning system and the air, and a radiator 220 for cooling the engine cooling water by exchanging heat between the engine cooling water (fluid) and the air are arranged (the heat exchanger 210 and the radiator 220 are hereinafter generically referred to as the heat exchanger 200). The heat exchanger 200 is secured to the panel 100 (guide duct portion 142).

In FIG. 3, numeral 230 designates a fan for supplying the cooling air to the heat exchanger, and numeral 231 designates a fan shroud for fixedly securing the fan 230 to the heat exchanger 200 (the radiator 220 in this embodiment) while at the same time covering the fan 230 for preventing the air from being circulated (short-circuited) between the intake side and discharge side of the fan 230.

In FIG. 1, numeral 300 designates a design grille (hereinafter referred to as the grille) of resin (ABS resin in this embodiment) arranged forward of the panel 100 and assembled on the panel 100 for forming a design shape of the front end portion of the vehicle. The portion of the grille 300 corresponding to the cooling air inlet 140 is formed with openings 310 in the form of slits for introducing the cooling air.

Numeral 400 designates a metal bumper reinforcement (hereinafter referred to as the bumper) arranged on the front end side of the vehicle for absorbing the shock imparted on the front end portion of the vehicle, and numeral 410 designates a bumper cover of resin (polypropylene in this embodiment) covering the bumper 400.

The bumper cover 410, as shown in FIG. 3, includes a bumper wall portion 411 protruded toward the panel 100 and having the end portion thereof spaced from the panel 100 with a predetermined gap $\delta 2$. In similar fashion, the forward end side of the panel wall portion 141 of the panel 100 is spaced from the bumper cover 410 with a predetermined gap $\delta 1$.

The panel wall portion 141 and the bumper wall portion 411 are in opposed relation to each other in such a manner as to be partially overlapped with each other when viewed in the transverse direction (lateral direction) of the vehicle. The opposed surfaces 144, 412 of the portions 141, 411 constitute a labyrinth structure by being spaced from each other with a predetermined gap $\delta 3$.

Figure 4:
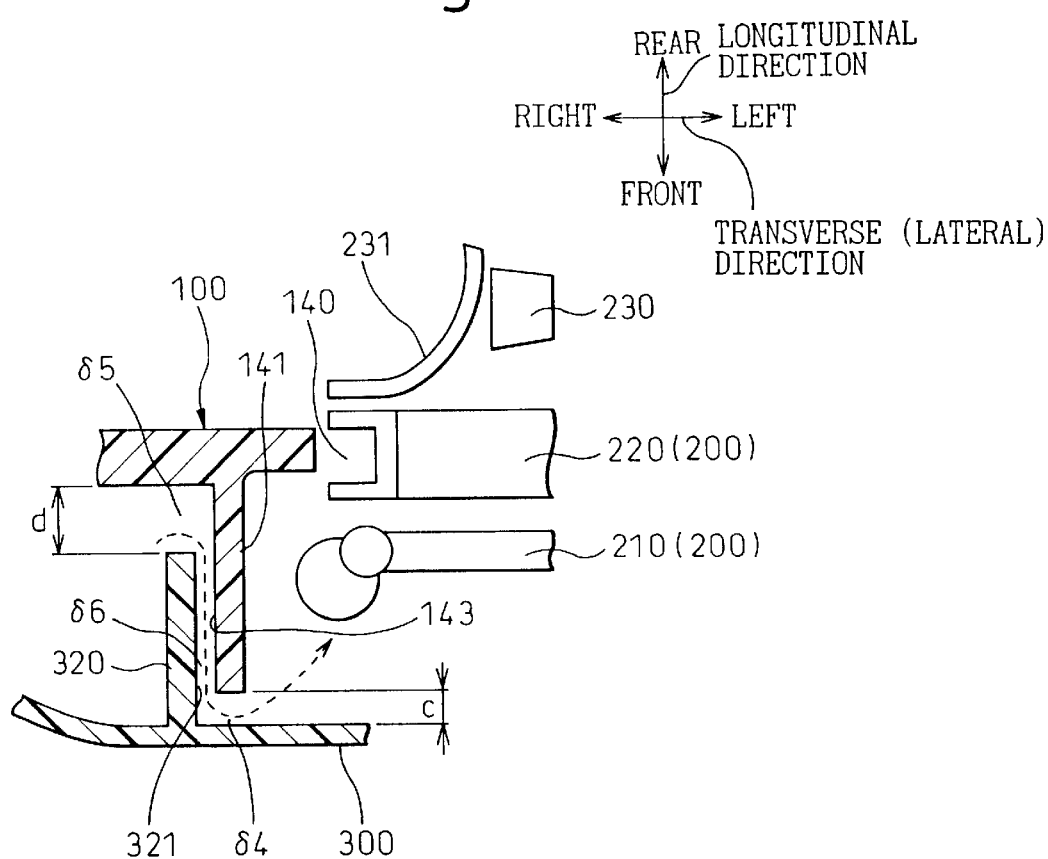
FIG. 4 is a sectional view taken in line B—B in FIG. 1.

The grille 300 is formed, as shown in FIG. 4, with a grille wall portion 320 protruded toward the panel 100 and having the end portion thereof spaced from the panel 100 with a predetermined gap $\delta 5$. In similar fashion, the forward end side of the panel wall portion 141 of the panel 100 is spaced from the grille 300 with a predetermined gap $\delta 4$.

The panel wall portion 141 and the grille wall portion 320 are in opposed relation to each other in such a manner as to be partially overlapped with each other when viewed in the transverse direction (lateral direction) of the vehicle, and the opposed surfaces 143, 321 of the portions 141, 320 constitute a labyrinth structure by being spaced from each other with a predetermined gap $\delta 6$.

In FIG. 1, the grille 300 and the bumper cover 410 are shown as if they each include a plurality of parts in order to facilitate the understanding of the presence of the grille wall portion 320 and the bumper wall portion 411. Actually, however, the grille 300 and the bumper cover 410 each constitute an integrated single part.

Now, the features of this embodiment will be explained.

According to this embodiment, gaps are formed between the panel wall portion 141 and the bumper cover 410, between the panel wall portion 141 and the grille 300, between the bumper wall portion 411 and the panel 100 and between the grille wall portion 320 and the panel 100. Also, labyrinth structures are constituted of the panel wall portion 141 and the bumper wall portion 411 on the one hand and the panel wall portion 141 and the grille wall portion 320 on the other hand. Thus, the draft resistance (pressure loss) on the opposed surfaces 144, 412, 143, 321 increases to such an extent that heat is prevented from going (flowing) around to before the heat exchanger 200 (vehicle), while at the same time reducing the damage under a shock which may be imparted on the front end portion of the vehicle.

For reducing the damage under a shock sufficiently, the length a of the gap $\delta 1$, the length b of the gap $\delta 2$, the length c of the gap $\delta 4$ and the length d of the gap $\delta 5$ are required to be larger than the amount of deformation of the bumper cover 410 and the grille 300 under a shock.

Also, the panel wall portion 141 and the wall portions 320, 411 in opposed relation to the panel wall portion 141, as shown in FIGS. 3 and 4, are arranged substantially in parallel to the longitudinal direction of the vehicle. In the case where a shock directed from the front side to the rear side of the vehicle is imparted on the front end portion of the vehicle, therefore, the grille wall portion 320 and the bumper wall portion 411 can be deformed (displaced) toward the panel 100 without interference between the panel wall portion 141 and the grille wall portion 320 and between the panel wall portion 141 and the bumper wall portion 411. As a result, the damage can be more surely reduced under a shock which may be imparted on the front end portion of the vehicle.

Also, since the opposed surfaces 144, 412, 143, 321 are spaced from each other with predetermined gaps $\delta 3$, $\delta 6$, it is possible to prevent the heat from going (flowing) around to before the heat exchanger 200 (vehicle) and to reduce the damage under a shock which may be imparted on the front end portion of the vehicle while absorbing the production variations and the assembly variations of the panel 100, the grille 300 and the bumper cover 410.

No practical problem is posed even in the case where the opposed surfaces 144, 412, 143, 321 come into contact with each other due to the production variations or the assembly variations.

(Second Embodiment)

Figure 5:
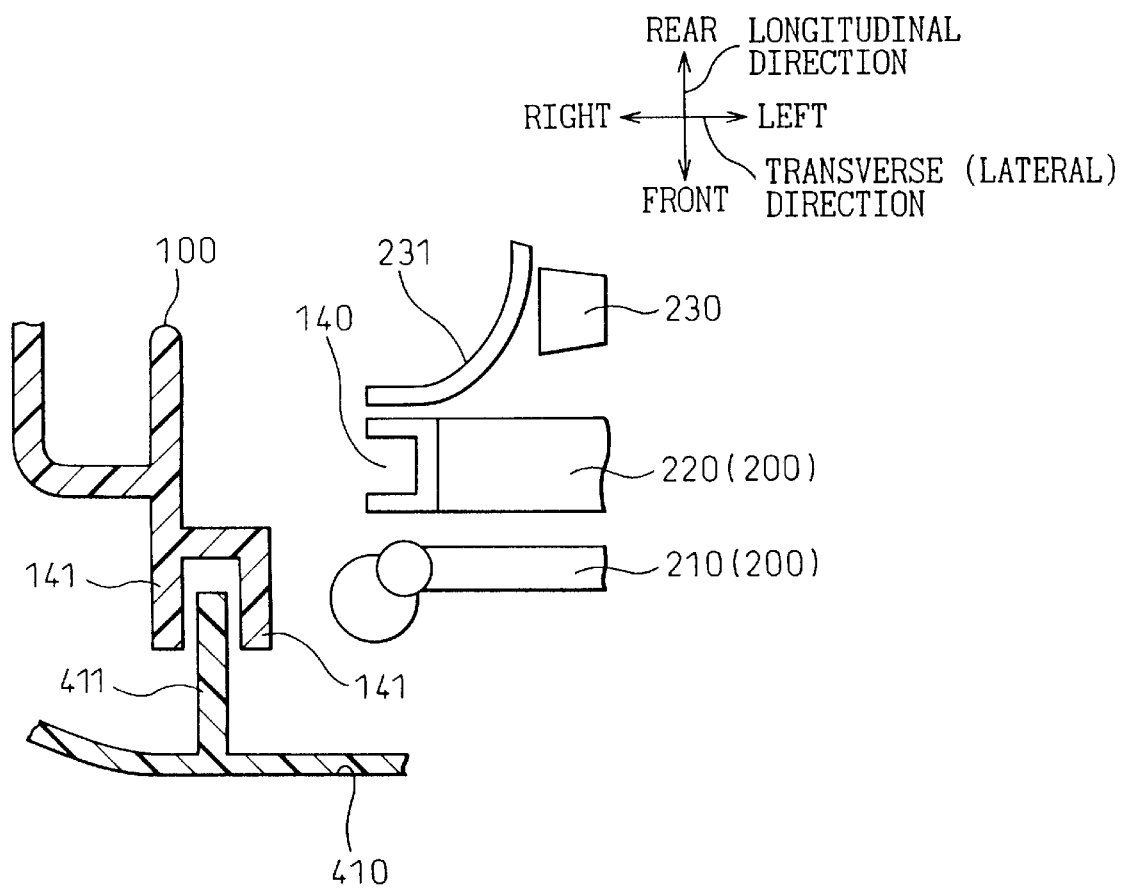
FIG. 5 is a sectional view corresponding to the sectional view taken in line A—A in FIG. 1 showing the front end structure of the vehicle according to a second embodiment of the invention.
Figure 6:
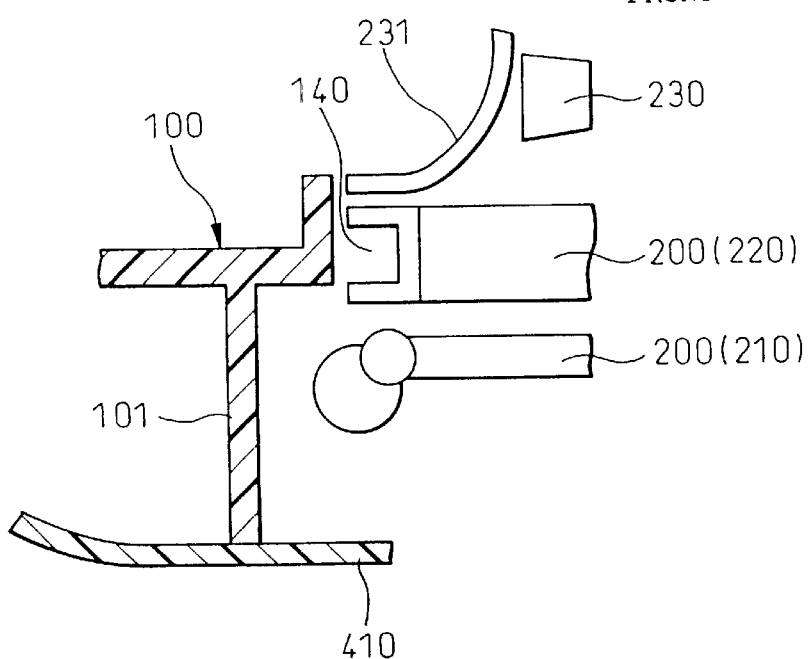
FIG. 6 is a sectional view corresponding to the sectional view taken in line A—A in FIG. 1 showing the front end structure of the vehicle according to the prior art.
Figure 7:
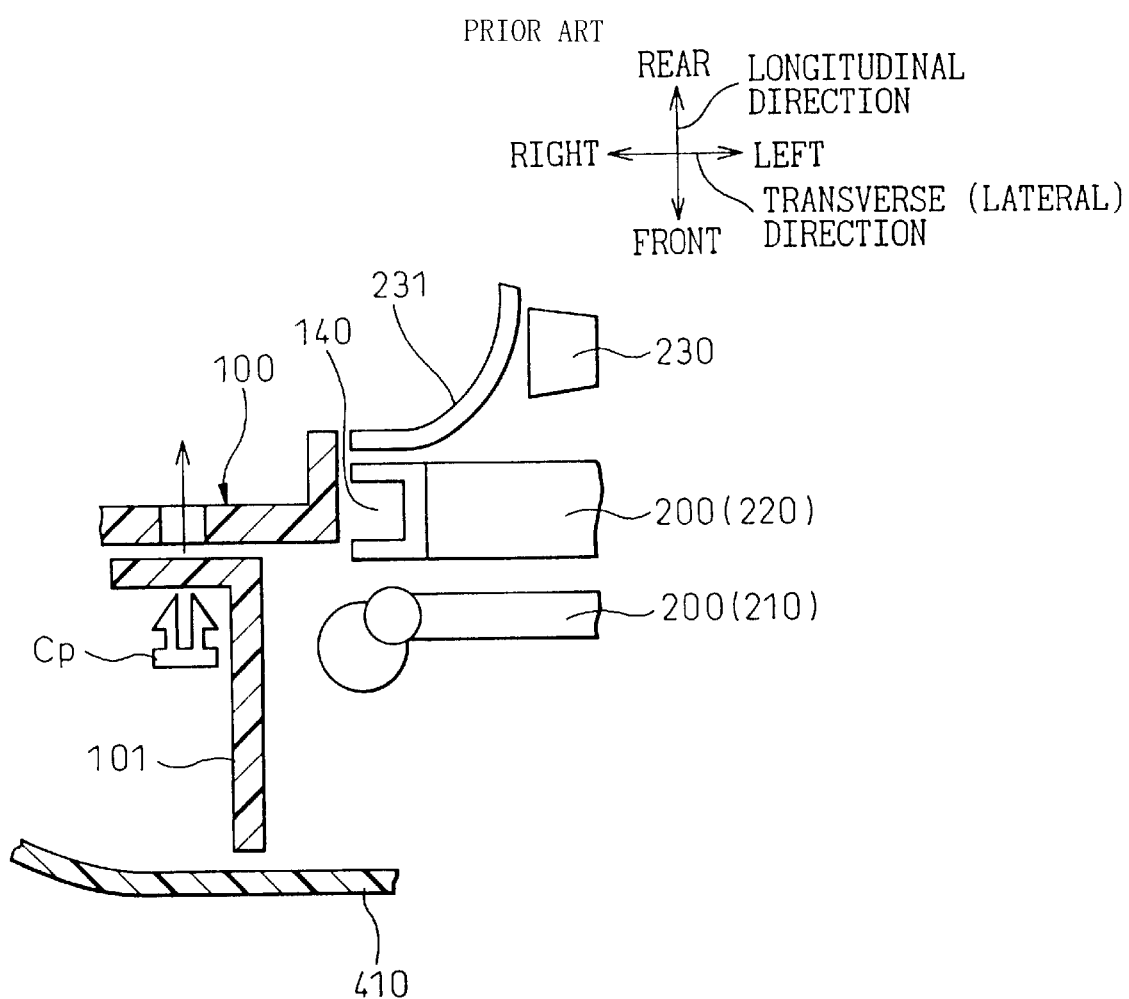
FIG. 7 is a sectional view corresponding to the sectional view taken in line A—A in FIG. 1 showing another front end structure of the vehicle according to the prior art.

Unlike in the first embodiment wherein the panel wall portion 141 is opposed only to one side of the grille wall portion 320 and the bumper wall portion 411, the second embodiment is such that as shown in FIG. 5, the forward end portion of the panel wall portion 141 has a U-shaped section so that the two sides of the grille wall portion 320 and the bumper wall portion 411 are opposed to the panel wall portion 141.

As a consequence, the draft resistance (pressure loss) on the opposed surfaces 144, 412, 143, 321 increases (due to the lengthened path of the labyrinth structure), and therefore heat is more surely prevented from going (flowing) around to before the heat exchanger 200 (vehicle).

(Other Embodiments)

According to the aforementioned embodiments, the opposed surfaces 144, 412, 143, 321 are spaced from each other with predetermined gaps $\delta 3$, $\delta 6$, respectively. Nevertheless, the opposed surfaces 144, 412, 143, 321 may be in contact with each other instead of forming the gaps $\delta 3$, $\delta 6$.

Further, although the panel 100, the grille 300 and the bumper cover 410 according to the aforementioned embodiments are made of resin, the present invention is not confined to such a material but may employ other materials such as metals, etc.

Furthermore, in the embodiments described above, the cooling air inlet 140 is open in the portion corresponding to both the grille 300 and the bumper 410, and therefore wall portions opposed to the panel wall portion 141 are formed on both the grille 300 and the bumper cover 410. In the case where the cooling air inlet 140 is open in the portion corresponding to only one of the grille 300 and the bumper cover 410, however, a wall portion opposed to the panel wall portion 141 may be formed only on the portion corresponding to the cooling air inlet 140.

In addition, although the aforementioned embodiments are such that the panel wall portion 141 is protruded toward the front side of the vehicle from the outer edge portion of the cooling air inlet 140, the position of the panel wall portion 141 is not strictly limited to the outer edge portion of the cooling air inlet 140, but may include the neighborhood of the outer edge portion of the cooling air inlet 140 away from the outer edge portion of the cooling air inlet 140.

While the invention has been described by reference to specific embodiments chosen for purpose of illustration, it should be apparent that numerous modifications could be made thereto by those skilled in the art without departing from the basic concept and scope of the invention.

What is claimed is:

1. A front end structure of a vehicle, comprising:
   a front end panel (100) arranged on a front end portion of the vehicle for compartmenting the front end portion of the vehicle into an engine compartment containing an internal combustion engine and a portion other than the engine compartment, the front end panel (100) including an air inlet (140) for introducing air from a front side of the vehicle into the engine compartment;
   a heat exchanger (200) for cooling fluid with the air passing through the air inlet (140); and
   a bumper cover (410) arranged forward of the front end panel (100) and covering a bumper reinforcement (400) for absorbing shock acting on the front end portion of the vehicle;
   wherein the front end panel (100) includes a panel wall portion (141) protruded toward the vehicle front side from an outer edge portion of the air inlet (140) and having a forward end portion thereof spaced from the bumper cover (410) with a predetermined gap ($\delta 1$),
   wherein the bumper cover (410) includes a bumper wall portion (411) protruded toward the front end panel (100) and having the end portion thereof spaced from the front end panel (100) with a predetermined gap ($\delta 2$), and
   wherein the wall portions (141, 411) have surfaces (144, 412) facing in opposed relation to each other, respectively.

2. A front end structure of a vehicle, comprising:
   a front end panel (100) arranged on a front end portion of the vehicle for compartmenting the front end portion of the vehicle into an engine compartment containing an internal combustion engine and a portion other than the engine compartment, the front end panel (100) including an air inlet (140) for introducing air from a front side of the vehicle into the engine compartment;
   a heat exchanger (200) for cooling fluid with the air passing through the air inlet (140); and
   a design grille (300) arranged forward of the front end panel (100) for forming a design shape of the front end portion of the vehicle;
   wherein the front end panel (100) includes a panel wall portion (141) protruded toward the vehicle front side from an outer edge portion of the air inlet (140) and having a forward end portion thereof spaced from the design grille (300) with a predetermined gap ($\delta 4$),
   wherein the design grille (300) includes a grille wall portion (320) protruded toward the front end panel (100) and having the end portion thereof spaced from the front end panel (100) with a predetermined gap ($\delta 5$), and
   wherein the wall portions (141, 320) have surfaces (143, 321) facing in opposed relation to each other, respectively.

3. A front end structure of a vehicle, comprising:
   a front end panel (100) arranged on a front end portion of the vehicle for compartmenting the front end portion of the vehicle into an engine compartment containing an internal combustion engine and a portion other than the engine compartment, the front end panel (100) including an air inlet (140) for introducing air from a front side of the vehicle into the engine compartment;
   a heat exchanger (200) for cooling fluid with the air passing through the air inlet (140);
   a bumper cover (410) arranged forward of the front end panel (100) and covering a bumper reinforcement (400) for absorbing shock which may act on the front end portion of the vehicle; and
   a design grille (300) arranged forward of the front end panel (100) for forming a design shape of the front end portion of the vehicle;
   wherein the front end panel (100) includes a panel wall portion (141) protruded toward the vehicle front side from an outer edge portion of the air inlet (140) and having a forward end portion thereof spaced from the bumper cover (410) and the design grille (300) with predetermined gaps ($\delta 1$, $\delta 4$),
   wherein the bumper cover (410) includes a bumper wall portion (411) protruded toward the front end panel (100) and having the end portion thereof spaced from the front end panel (100) with a predetermined gap ($\delta 2$),
   wherein the design grille (300) includes a grille wall portion (320) protruded toward the front end panel (100) and having the end portion thereof spaced from the front end panel (100) with a predetermined gap ($\delta 5$), and
   wherein the panel wall portion (141) faces to the bumper wall portion (411) and the grill wall portion (320) in opposed relation, respectively.

4. A front end structure of a vehicle according to claim 1, wherein the panel wall portion (141) and the bumper wall portion (411) in opposed relation to the panel wall portion (141) are arranged substantially in parallel to the longitudinal direction of the vehicle.

5. A front end structure of a vehicle according to claim 2, wherein the panel wall portion (141) and the grille wall portion (320) in opposed relation to the panel wall portion (141) are arranged substantially in parallel to the longitudinal direction of the vehicle.

6. A front end structure of a vehicle according to claim 3, wherein the panel wall portion (141) and the bumper and grille wall portions (411, 320) in opposed relation to the panel wall portion (141) are arranged substantially in parallel to the longitudinal direction of the vehicle.

* * * * *